United States Patent
Jaaskelainen et al.

(10) Patent No.: US 7,683,141 B2
(45) Date of Patent: Mar. 23, 2010

(54) POLYMER FILM COMPRISING A PROPYLENE RANDOM COPOLYMER

(75) Inventors: Pirjo Jaaskelainen, Porvoo (FI); Markus Gahleitner, Neuhofen (AT); Manfred Kirchberger, Prambachkirchen (AT); Paivi Pitkanen, Halkia (FI)

(73) Assignee: Borealis Technology Oy, Porvoo (FI)

( * ) Notice: Subject to any disclaimer, the term of this patent is extended or adjusted under 35 U.S.C. 154(b) by 440 days.

(21) Appl. No.: 10/481,785

(22) PCT Filed: Jun. 26, 2002

(86) PCT No.: PCT/EP02/07085

§ 371 (c)(1),
(2), (4) Date: Apr. 7, 2004

(87) PCT Pub. No.: WO03/002639

PCT Pub. Date: Jan. 9, 2003

(65) Prior Publication Data
US 2004/0175591 A1 Sep. 9, 2004

(30) Foreign Application Priority Data
Jun. 27, 2001 (EP) .................................. 01115469

(51) Int. Cl.
*C08J 5/18* (2006.01)
*C08L 23/14* (2006.01)
(52) U.S. Cl. ...................... 526/65; 526/73; 526/348; 526/348.1; 525/53; 525/55; 525/240
(58) Field of Classification Search .................. 525/53, 525/55, 240; 526/65, 73, 348, 348.1
See application file for complete search history.

(56) References Cited

U.S. PATENT DOCUMENTS

| | | | | |
|---|---|---|---|---|
| 4,822,840 | A | * | 4/1989 | Kioka et al. ................ 525/240 |
| 5,358,792 | A | * | 10/1994 | Mehta et al. ................ 428/516 |
| 5,587,436 | A | * | 12/1996 | Klimek et al. ............... 526/59 |
| 5,984,839 | A | | 11/1999 | Corkum |
| 6,221,984 | B1 | | 4/2001 | Kersting et al. |
| 7,452,953 | B2 | * | 11/2008 | Jaaskelainen et al. ....... 526/348 |
| 2001/0044506 | A1 | * | 11/2001 | Mehta et al. ................ 526/65 |

FOREIGN PATENT DOCUMENTS

| | | | |
|---|---|---|---|
| AU | B-351/93 | * | 9/1993 |
| AU | B-35138/93 | | 9/1993 |
| EP | 0 538 749 | | 4/1993 |
| EP | 0 761 700 | | 3/1997 |
| EP | 887 380 A1 | * | 12/1998 |
| EP | 982328 A1 | * | 3/2000 |
| JP | 60 055046 A | | 3/1985 |
| JP | 07 278377 A | | 10/1995 |
| RU | 2 104 289 | | 2/1998 |
| WO | WO 97 21746 A | | 6/1997 |
| WO | WO 98 58971 A | | 12/1998 |
| WO | WO 99/16797 | * | 4/1999 |

OTHER PUBLICATIONS

P. Ville et al., "Polymer," vol. 42, pp. 1953-1967, (2001).

* cited by examiner

*Primary Examiner*—Roberto Rábago
(74) *Attorney, Agent, or Firm*—Milbank, Tweed, Hadley & McCloy, LLP (57) ABSTRACT

The present invention relates in a first embodiment to a polymer film comprising a propylene random copolymer with a total comonomer content of 4.5 to 12 mol % wherein the sealing initiation temperature SIT of the film is $T_m-30°$ C. or less, preferably $T_m-33°$ C. or less, in a second embodiment to a polymer film comprising a propylene random copolymer with a total comonomer content of 4.5 to 12 mol % wherein the film is having a relative reduction of the static friction value (inside-inside) from one to four days of 35% or more, preferably 40% or more, in a third embodiment to a polymer film comprising a propylene random copolymer with a total comonomer content of 4.5 to 12 mol % wherein the distribution of the comonomer in the random copolymer determined according to TREF method is multimodal, preferably bimodal, in a fourth embodiment to a polymer film comprising a propylene random copolymer with a total comonomer content of 4.5 to 12 mol %, wherein the copolymer is having an elution interval of 50° C. or more, and in a fifth embodiment to a polymer film comprising a copolymer with a total comonomer content of 4.5 to 12 mol % wherein the random copolymer is a unimodal polymer and the elution interval is determined by the equation $$Y \leq 4.5 \cdot m + 16$$

wherein Y is the elution interval in ° C. and
m is the percentage of ethylene in the copolymer in wt. %.

6 Claims, 5 Drawing Sheets

POLYMER FILM COMPRISING A PROPYLENE RANDOM COPOLYMER

The present invention relates to a polymer film comprising a propylene random copolymer with the comonomer being ethylene or an α-olefin, in particular ethylene, having at least four carbon atoms and a total comonomer content of 4.5 to 12 mol %.

The production of films is one of the main applications of propylene random copolymers. Such films, in turn, are applied mainly for packaging purposes such as food packaging.

For these applications the properties of the film and hence the properties of the polymer used for its production are essential. Therefore, several modifications of processes for the production of propylene random copolymers as well as the use of several modified propylene random copolymers for films are known.

For example, in EP 0 761 700 a gas phase process for the production of propylene-ethylene random copolymer and the production of a film thereof are disclosed. In U.S. Pat. No. 5,984,839 a propylene copolymer composition for films and a process for the production thereof are disclosed. The copolymer composition comprises a propylene homopolymer phase and a propylene/ethylene copolymer phase.

Among the desired film properties there are good optical properties as e.g. high transparency, low haze and high gloss, good heat sealing properties and good mechanical properties.

Polymer films produced from known propylene random copolymers still may be improved with respect to these properties, in particular with respect to a combination of satisfactory values for all or some of the above-mentioned properties.

It is therefore one object of the present invention to provide a polymer film comprising a propylene random copolymer with good optical properties such as high transparency, low haze and high gloss. It is further an object of the invention to provide such a film with good sealing properties, high softness and good slip properties. Furthermore, it is an object of the present invention to provide such a film having no or only low tendency to blooming and a low degree of xylene solubles.

The present invention in a first embodiment provides a polymer film comprising a propylene random copolymer with the comonomer being ethylene or an α-olefin having at least four carbon atoms and a total comonomer content of 4.5 to 12 mol % wherein the sealing initiation temperature SIT of the film is $T_m-30°$ C. or less, preferably $T_m-33°$ C. or less.

The polymer film of this embodiment is showing superior sealing properties due to the low SIT in relation to the melting temperature $T_m$.

The present invention in a second embodiment provides a polymer film comprising a propylene random copolymer with the comonomer being ethylene or an α-olefin having at least four carbon atoms and a total comonomer content of 4.5 to 12 mol % wherein the film is having a relative reduction of the static friction value (inside-inside) from one to four days of 35% or more, preferably 40% or more.

The polymer film of this embodiment is showing superior processing properties due to the enhanced decrease of the static friction values which allows for the film being further processed within a shorter time after its production.

The present invention in a third embodiment provides a polymer film comprising a propylene random copolymer with the comonomer being ethylene or an α-olefin having at least four carbon atoms and a total comonomer content of 4.5 to 12 mol % wherein the distribution of the comonomer in the random copolymer determined according to TREF method is multimodal, preferably bimodal.

TREF (temperature rising elution fractionation) is a common method to fractionate polyolefins according to their solubility differences. It has been demonstrated for polypropylene that TREF fractograms qualitatively reflect the distribution of isotacticity in the polymer. The average length of isotactic chains increases almost linearly with increasing elution temperature (P. Ville et al., Polymer 42 (2001) 1953-1967). The results further showed that TREF does not strictly fractionate polypropylene according to tacticity but according to the longest crystallisable sequences in the chain. The solubility of a polypropylene polymer chain hence is influenced only by the concentration and distribution of sterical defects.

According to the invention it has been found that a process as described below provides for an even comonomer distribution in the propylene copolymer. The comonomers act as sterical defects and hence interrupt the sequence of isotactic propylene monomers. By an even distribution of the comonomers an even distribution of sterical defects is obtained, i.e. it is possible by this process to tailor the defect distribution and hence the isotacticity distribution of the polypropylene polymer.

It is hence possible to determine the comonomer distribution and accordingly its modality by the TREF method which in detail is described in the example section.

The term "modality of the comonomer distribution of the copolymer" refers to the form of the curve in the TREF fractogram, i.e. the appearance of the graph showing the polymer weight fraction as a function of its solution temperature.

If the polymer is produced in a multistage process, e.g. in the process described below by using different ethylene contents in each reactor, the different polymer fractions produced in the different reactors will each have their own comonomer distribution which may considerably differ from one another. The TREF curve of the resulting final polymer is then obtained as a superposition of the TREF curves of the different polymer fractions.

Accordingly, this curve will for example show two or more distinct maxima, a maximum and one or more shoulders, or will at least be distinctly broadened compared to the curves for the individual fractions. The TREF curve is having such a shape so that for the person skilled in the art it is clear that the broadened curve is originating from a superposition of two or more different TREF curves and hence shows a multimodal ethylene distribution.

A polymer showing such a TREF curve is designated as having a "multimodal comonomer distribution".

Accordingly, "bimodal comonomer distribution" is designating the case that the TREF curve of the final polymer is originating from two polymer fractions with different ethylene distributions. This TREF curves for example is showing two different maxima, a maximum and a shoulder or is distinctly broadened. It is having such a shape so that for the person skilled in the art it is clear that the curve is originating from a superposition of two different TREF curves.

Preferably, the multimodal copolymer is having an elution interval of 50° C. or more.

The elution interval designates the temperature range of the polymer elution determined from the TREF curve, i.e. the temperature range $T_{end}-T_{start}$, wherein $T_{end}$ means the temperature where the last polymer fraction is eluted, i.e. at this temperature the polymer has been completely eluted from the column, and $T_{start}$ means the temperature where the polymer starts to elute, i.e. where the first fraction of the polymer is eluted (eluted weight fraction >0).

Further preferred, the copolymer is having a melting temperature $T_m$ of 135° C. or higher.

Further preferred, the copolymer is having an ethylene content of 5 wt. % or lower.

The present invention in a fourth embodiment provides a polymer film comprising a propylene random copolymer with the comonomer being ethylene or an α-olefin comprising at least four carbon atoms, wherein the copolymer is having an elution interval of 50° C. or more.

Preferably, the copolymer in this embodiment is having a melting temperature $T_m$ of 135° C. or higher.

Further preferred, the copolymer in this embodiment is having an ethylene content of 5 wt. % or lower.

The copolymer in this embodiment is preferably produced according to the multistage process described below and further preferred to all preferred embodiments of this process wherein the ethylene content of the products from slurry reactor and gas phase reactor are different.

The present invention in a fifth embodiment provides a polymer film comprising a propylene random copolymer with the comonomer being ethylene or an α-olefin comprising at least four carbon atoms, wherein the random copolymer is a unimodal polymer and the elution interval is determined by the equation $$Y \leq 4.5 \cdot m + 16$$

wherein Y is the elution interval in ° C. and m is the percentage of ethylene in the copolymer in wt. %.

Such unimodal polymers are preferably produced by the multistage process described below wherein the ethylene content of the products from the slurry reactor and the gas phase reactor is the same.

It is preferred that a polymer film according to any of the second to fifth of the above-described embodiments is having a sealing initiation temperature SIT of $T_m-30°$ C. or less, preferably $T_m-33°$ C. or less.

It is further preferred that a polymer film according to any of the first, third, fourth or fifth of the above-described embodiments is having a relative reduction of the static friction value (inside-inside) from one to four days of 35% or more, preferably 40% or more.

It is further preferred that a polymer film according to any of the first and second of the above-described embodiments comprises a propylene random copolymer wherein further the distribution of the comonomer in the random copolymer determined according to TREF method is multimodal, preferably bimodal.

It is further preferred that a polymer film according to any of the first and second of the above-described embodiments comprises a propylene random wherein the copolymer is having an elution interval of 50° C. or more.

It is further preferred that a polymer film according to any of the first and second of the above-described embodiments comprises a propylene random copolymer wherein the random copolymer is a unimodal polymer and the elution interval is determined by the equation $$Y \leq 4.5 \cdot m + 16$$

wherein Y is the elution interval in ° C. and m is the percentage of ethylene in the copolymer in wt. %.

In the following, preferred embodiments for all of the above-mentioned embodiments one to five, where appropriate, of the inventive polymer film are given.

It is particularly preferred that the comonomer in the propylene random copolymer used for the production of the inventive film is ethylene.

Further preferred, the total ethylene content of the copolymer is 3 wt. % or more, more preferably 5 wt % or more.

Further preferred, the total ethylene content of the copolymer is 9 wt. % or less, more preferably 8 wt. % or less.

In many applications, it is desired that the tensile modulus of the film is low so that "soft" films are obtained. It is therefore preferred that the inventive polymer film is having a tensile modulus in the machine direction (MD) of 400 MPa or less, preferably 350 MPa or less.

The polymer film according to the present invention preferably is having a thickness of 10 to 500 μm, more preferably of 20 to 200 μm.

Preferably, the propylene random copolymer used for the production of the inventive film has an $MFR_2$ of 1 to 20, preferably of 2 to 12.

It is further preferred that the content of xylene solubles of the inventive polymer film is from 4 to 15 wt. %, more preferred from 6 to 10 wt. %.

In a further embodiment of the inventive polymer film, the film further comprises a nucleating agent. Such nucleating agents are for example sodium benzoate (CAS 532-32-1); 1,3:2,4-bis(3,4-dimethylbenzylidene)-sorbitol (CAS 135861-56-2, Millad 3988). The application of a nucleating agent increases the crystallisation rate of the polymer film. They are predominantly used for the production of thicker films for improving the optical properties thereof and/or for the improvement of the ageing properties of films.

The inventive polymer film can be produced by any film making process known to the skilled person. In particular, the film can be produced by a cast process, a cast process with subsequent orientation of the film leading to a biaxial oriented polypropylene (BOPP) film, a roll stack process or a blown film process.

It is preferred that the inventive polymer film is produced in a cast process or a process leading to BOPP or a blown film process.

In case the film is produced by a cast process it is preferred that the polymer before film forming is subjected to a "controlled rheology" (visbreaking) process. This is done in order to obtain required values for e.g. $MFR_2$, polydispersity index PI and $M_w/M_n$ of the polymer.

Visbreaking of the copolymer is normally carried out in the molten stage of the polymer in single- or twin-screw extruders in the presence of free radical initiators such as peroxides, preferably in an inert atmosphere. Visbreaking processes are well known to the skilled person. Usually, visbreaking e.g. leads to a significant increase in the $MFR_2$ value.

It is further preferred that the propylene random copolymer after visbreaking is having an $MFR_2$ value of 6.0 to 12.0 g/10 min.

In case the film is produced in a blown film process the polymer usually is not subjected to a visbreaking process before film making. The $MFR_2$ of the propylene random copolymer accordingly is preferably from 1.5 to 3.0 g/10 min.

The propylene random copolymer used for the production of the inventive polymer film preferably has a molecular weight distribution with a polydispersity $M_w/M_n$ from 2 to 7, preferably from 4 to 6.

It is further preferred that the polymer used for the production of the inventive cast film after visbreaking has a shear thinning index SHI of 3 to 5, further preferred of 3.5 to 4.5.

The propylene random copolymers used for the production of the inventive film which may be obtained according to the process described below usually have a high degree of isotacticity measured in accordance to the FTIR-method, due to the catalyst systems (single-site or Ziegler-Natta) used for polymerisation.

Preferably, the propylene polymer has a degree of isotacticity as determined from FTIR (as described in: T. Sundell, H. Fagerholm & H. Crozier, *Isotacticity determination of polypropylene using FT-Raman spectroscopy*, Polymer 37, 1996, 3227-31) of 90% or more, more preferably of 95% or more and most preferably of 98% or more.

Further, before the production of the inventive film by using propylene random copolymer conventional additives may be added to the copolymer in small amounts.

The copolymer may contain commonly used additives like:
phenolic antioxidants like 2,6-di-tert.buty-4-methylphenol (CAS 128-37-0, BHT); Pentaerithrityl-tetrakis(3-(3',5'-di-tert.butyl-4-hydroxyphenyl)-propionate) (CAS 6683-19-8, Irganox 1010); Octadecyl-3-(3',5'-di-tert. butyl-4-hydroxyphenyl)-propionate) (CAS 2082-79-3, Irganox 1076),
phosphorus-containing antioxidants like Tris(2,4-di-tert. butylphenyl)-phosphite (CAS 31570-04-4, Irgafos 168); Bis(2,4-di-tert.butylphenyl)-pentaerithrityl-diphosphite (CAS 26741-53-7, Ultranox 626)
C-radical scavengers like 5,7-di-tert.butyl-(3-(3,4-di-methylphenyl)3H-benzofuran-2-one (CAS 181314-48-7, HP 136)
acid scavengers like Calcium stearate (CAS 1592-23-0); Zinc stearate (CAS 557-05-1); Hydrotalcite (CAS 11097-59-9)
UV-stabilisers like Bis-(2,2,6,6-tetramethyl-4-piperidyl)-sebacate (CAS 52829-07-9, Tinuvin 770); 2-hydroxy-4-n-octoxy-benzophenone (CAS 1843-05-6, Cimassorb 81)
antistatic agents like glycerol-monostearate (CAS 97593-29-8)
nucleating agents like sodium benzoate (CAS 532-32-1); 1,3:2,4-bis(3,4-dimethylbenzylidene)sorbitol (CAS 135861-56-2, Millad 3988)
slip agents like erucamide (CAS 112-84-5); oleamide (CAS 301-02-0)
antiblocking agents like natural or synthetic silica (CAS 7631-86-9)

in quantities of 100-10.000 ppm for each single component.

The propylene random copolymer used for the inventive films in all of the above-described embodiments is preferably produced in a process for preparing a propylene random comonomer comprising polymerisation of propylene with a comonomer, said comonomer being ethylene or an α-olefin comprising at least four carbon atoms, in the presence of a catalyst in a multistage process comprising polymerisation of propylene with a comonomer in a first reaction zone including at least one slurry reactor to give a first polymerisation product, transferring said first product to a second reaction zone including at least one gas phase reactor and polymerisation of propylene with a comonomer in said gas phase reactor in the presence of said first polymerisation product, wherein the temperature in the gas phase reactor is higher than that in the slurry reactor.

With this process it is possible to produce propylene random copolymers with a tailored ethylene distribution and hence to fine-tune the properties of the produced polymer. Thus, by the inventive process the properties of the polymer can be adopted in particular for film applications so that polymers are obtained with excellent properties for this kind of application.

Further, it is an advantage of this process that due to the tailored comonomer distribution polymers with a low degree of xylene solubles (XS) content are obtained. Thus, problems in the process which can be caused by polymers with higher XS content are avoided.

Preferably, in the process the temperature in the gas phase reactor is at least 5° C., preferably at least 10° C. and most preferably at least 15° C. higher than that in the slurry reactor.

In the process the comonomer content of the product produced in the gas phase reactor may be lower, equal to or higher than that of the product produced in the slurry reactor.

Of course, due to the multistage nature of the inventive process both products after being produced are inseparably mixed with each other. The properties of the product produced in the gas phase reactors such as its ethylene content may nevertheless be determined by considering the corresponding values for the slurry reactor product and the final polymer and taking into account the production split.

Preferably, in the process the comonomer content of the product produced in the gas phase reactor is the same or higher than that of the product produced in the slurry reactor and particularly preferred the comonomer content of the product produced in the gas phase reactor is higher than that of the product produced in the slurry reactor.

Preferably, the comonomer content of the product produced in the gas phase reactor is at least 0.75 mol % (corresponding to 0.5 wt. % for ethylene as a comonomer), more preferably at least 1.5 mol % (corresponding to 1 wt. % for ethylene as a comonomer) higher than that of the product produced in the slurry reactor.

Further preferred, the comonomer used in the process and hence contained in the obtained polymer is ethylene. Propylene-ethylene random copolymers are particularly suited for film applications.

In the process it is further preferred that the ethylene content of the product produced in the slurry reactor is from 3 to 6 wt. %, more preferably from 3 to 4 wt. %.

Further preferred, the ethylene content of the product produced in the gas phase reactor is from 3 to 10 wt. %, more preferably from 4 to 8 wt. %.

"Slurry reactor" designates any reactor such as a continous or simple batch stirred tank reactor or loop reactor operating in bulk or slurry, including supercritical conditions, in which the polymer forms in particulate form.

Preferably, the slurry reactor is operated as a bulk reactor. "Bulk" means a polymerisation in a reaction medium comprising at least 60 wt. % monomer.

Preferably, the bulk reactor is a loop reactor.

Further preferred, in the process the temperature in the slurry reactor is 65° C. or more, more preferably 70° C. or more.

Still further preferred, the temperature in the gas phase reactor is 80° C. or more, more preferably 85° C. or more.

In each of the different reactors—slurry reactor and gas phase reactor—a part of the final propylene random copolymer is produced. This production split between the reactors may be adjusted according to the desired properties of the produced copolymer.

It is preferred that the production split between the slurry reactor and the gas phase reactor is from 10:90 to 70:30, more preferred from 20:80 to 65:35 and most preferred from 40:60 to 60:40.

All catalysts suitable for the polymerisation of propylene with ethylene or an α-olefin such as single-site catalysts and Ziegler-Natta catalysts can be used. If single side catalysts are used, those described in WO 95/12627 and WO 00/34341 are preferred.

In a preferred embodiment of the process, a Ziegler-Natta type catalyst system comprising a catalyst component (comprising also vinyl-modified catalyst component), a cocatalyst component and an external electron donor is used. Such catalyst systems are described in, for example, U.S. Pat. No. 5,234,879, WO 92/19653, WO 92/19658 and WO 99/33843 and systems comprising vinyl-modified catalyst components in WO 99/24478 and WO 99/24479. The content of these documents is herein included by reference.

Generally, the external donors are silane based donors having the formula (I)

$$R_nR'_mSi(R''O)_{4-n-m} \quad (I)$$

wherein
R and R' can be the same or different and stand for linear, branched or cyclic aliphatic or aromatic group;
R'' is methyl or ethyl;
n is an integer 0 to 3;
m is an integer 0 to 3; and
n+m is 1 to 3.

The aliphatic groups in the meanings of R and R' can be saturated or unsaturated.

Preferably, R and R' are linear $C_1$ to $C_{12}$ hydrocarbons which include methyl, ethyl, propyl, butyl, octyl and decanyl. As examples of suitable saturated branched $C_{1-8}$ alkyl groups, the following can be mentioned: isopropyl, isobutyl, isopentyl, tert.-butyl, tert.-amyl and neopentyl. Cyclic aliphatic groups containing 4 to 8 carbon atoms comprise e.g. cyclopentyl, cyclohexyl, methylcyclopentyl and cycloheptyl.

According to the present invention the donors used can be strongly coordinating donors which form relatively strong complexes with catalyst surface, mainly with $MgCl_2$ surface in the presence of aluminium alkyl and $TiCl_4$.

Typically, this kind of donors have the structure of the general formula (II):

$$R'''_nSi(OMe)_{4-n} \quad (II)$$

wherein R''' is a branched aliphatic or cyclic or aromatic group and n is 1 or 2, preferably 2 [Häarkönen et al., Macromol. Chem. 192 (1991) 2857-2863].

In particular, the external donor is selected from the group consisting of di-cyclopentyl dimethoxysilane, diisopropyl dimethoxysilane, di-isobutyl di-methoxysilane and di-t-butyl dimethoxysilane, most preferably dicyclopentyl dimethoxysilane (D donor).

Optionally, the main polymerisation stages may be preceded by prepolymerisation in which up to 10 wt. %, preferably 0.1 to 10 wt. %, and most preferred from 0.5. to 5 wt. % of the total amount of the polymer is produced.

In the following the invention is further illustrated by means of examples with reference to the enclosed Figures.

EXAMPLES

1) Measuring Methods a) TREF-method

Fractionation of the polypropylene samples was achieved by using analytical TREF. The TREF profiles were generated using a home made instrument, which is similar to a published design (Wild, L., Trends Polym Sci. 1993, 1, 50).

The sample was dissolved in xylene (2 to 4 mg/ml) at 130° C. and injected into the column at 130° C., and the latter was then cooled to 20° C. at a rate of 1.5 K/h. The column was subsequently eluted with 1,2,4-trichlorobenzene (TCB) at a flow rate of 0.5 ml/min while the temperature was increased from 20° C. to 130° C. over 4.5 h. The output, detected with an i.r. detector operating at a wavelength of 3.41 μm, was presented as a fractogram normalised to constant area.

b) Xylene Solubles (XS)

For the determination of the xylene solubles fraction, 2.0 g of polymer is desolved in 250 ml p-xylene at 135° C. under agitation. After 30±2 min the solution is allowed to cool for 15 min at ambient temperature and then allowed to settle for 30 min at 25±0.5° C. The solution is filtered with filter paper into two 100 ml flasks.

The solution from the first 100 ml vessel is evaporated in nitrogen flow and the residue is dried under vacuum at 90° C. until constant weight is reached. The xylene soluble fraction is calculated using the following equation:

$$XS\% = (100 \cdot m_1 \cdot v_0)/(m_0 \cdot v_1)$$

wherein
$m_0$=initial polymer amount (g),
$m_1$=weight of residue (g),
$v_0$=initial volume (ml),
$v_1$=volume of analysed sample (ml).

c) $M_w/M_n$ $M_w/M_n$ was determined using gel permeation chromatography (GPC) at 130° C. As an eluent, 1,2,4-trichlorobenzene (TCB) was used.

d) Melt Flow Rate (MFR)

$MFR_2$ was measured according to ISO 1133 at 230° C. and a load of 2.16 kg.

e) Thermal Properties

Melting temperature $T_m$ determined according to ISO 3146, crystallisation temperature $T_{cr}$ and the degree of crystallinity were measured with a Mettler TA820 differential scanning calorimetry (DSC) on 3±0.5 mg samples. Both crystallisation and melting curves were obtained during 10° C./min cooling and heating scans between 30° C. and 225° C.

Melting and crystallisation temperatures were taken as the peaks of endotherms and exotherms. The degree of crystallinity was calculated by comparison with heat of fusion of a perfectly crystalline polypropylene, i.e. 209 J/g.

f) Viscosity Function and Shear Thinning (SHI)

Viscosity measurements are made with a dynamic rheometer (RDA-II QC).

The shear thinning index. SHI, is the most sensitive parameter for obtaining information about the MMD of polypropylene. SHI is calculated by dividing the Zero Shear Viscosity by a complex viscosity value obtained at a certain constant shear stress value, G*.

The Zero Shear Viscosity is defined as $$\eta_0 = \lim G''/\omega (\omega \to 0).$$

The abbreviation $SHI_{(0/50)}$ is the ratio between the zero shear viscosity and the viscosity at a shear stress of 50000 Pa.

2) Production of Copolymers and Properties Thereof

Continous multistage process was used to produce propylene copolymers. The process comprised a prepolymerisation step, a loop reactor and a fluidized bed gas phase reactor was used.

The catalyst used was highly active, stereospecific transesterified $MgCl_2$-supported Ziegler-Natta catalyst prepared according to U.S. Pat. No. 5,234,879 at a titanization temperature of 135° C. The catalyst was contacted with a co-catalyst (triethylaluminium, TEAL), and an external donor (donor D, dicyclopentyl dimethoxysilane) with the Al/Ti ratio of 200 and an Al/D ratio of 10, to yield a catalyst system.

The catalyst system and propylene were fed into the prepolymerisation reactor which was operated at 30° C. The prepolymerised catalyst was used in the subsequent polymerisation reactors.

Propylene, ethylene and hydrogen and the prepolymerised catalyst were fed into the loop reactor which was operated as bulk reactor at the temperatures as indicated in Table 1 and a pressure of 55 bar.

Then, the polymer slurry stream was fed from the loop reactor into the gas phase reactor which was operated at the temperatures as indicated in Table 1 and a pressure of 20 bar. More propylene, ethylene and hydrogen were fed into the gas phase reactor to control the desired properties of the final polymer.

In the comparative examples 1 and 2 propylene random copolymers were produced in the same manner as the inventive polymers except that two loop reactors instead of one gas phase and one loop reactor were used wherein the temperature in both loop reactors was the same (67° C.).

The split between loop/gas phase reactor or loop/loop reactor (comparative examples) was 70/30 to 40/60.

TABLE 1

|  | Unit | Example 1 | Example 2 | Example 3 | Comparative Example 1 | Comparative Example 2 |
| --- | --- | --- | --- | --- | --- | --- |
| Al/D | mol/mol | 10 | 10 | 10 | 10 | 10 |
| Al/Ti | mol/mol | 200 | 200 | 200 | 200 | 200 |
| Production split Loop:GPR/2nd loop) Loop |  | 70:30 | 40:60 | 45:55 | 60:40 | 60:40 |
| Temperature | ° C. | 70 | 70 | 70 | 67 | 67 |
| Ethylene | wt. % | 3.2 | 3.9 | 3.4 | 3.5 | 4.7 |
| $MFR_2$ | g/10 min | 1.5 | 1.5 | 1.5 | 1.5 | 1.5 |
| GPR/2nd loop |  |  |  |  |  |  |
| Temperature Final Product | ° C. | 85 | 85 | 85 | 67 | 67 |
| Ethylene | wt. % | 3.3 | 5.1 | 6.0 | 3.5 | 4.7 |
| $MFR_2$ | g/10 min | 1.3 | 1.3 | 1.5 | 1.5 | 1.5 | a) Polymer Structure and Properties

The analytical results of the polymers of table 1 are collected in table 2.

b) Ethylene Content and Distribution

Ethylene content in loop product varied between 3.2 and 3.9 wt. %. The final ethylene content was 3.3 wt. %, 5 wt. % to 6 wt. %.

Figure 1:
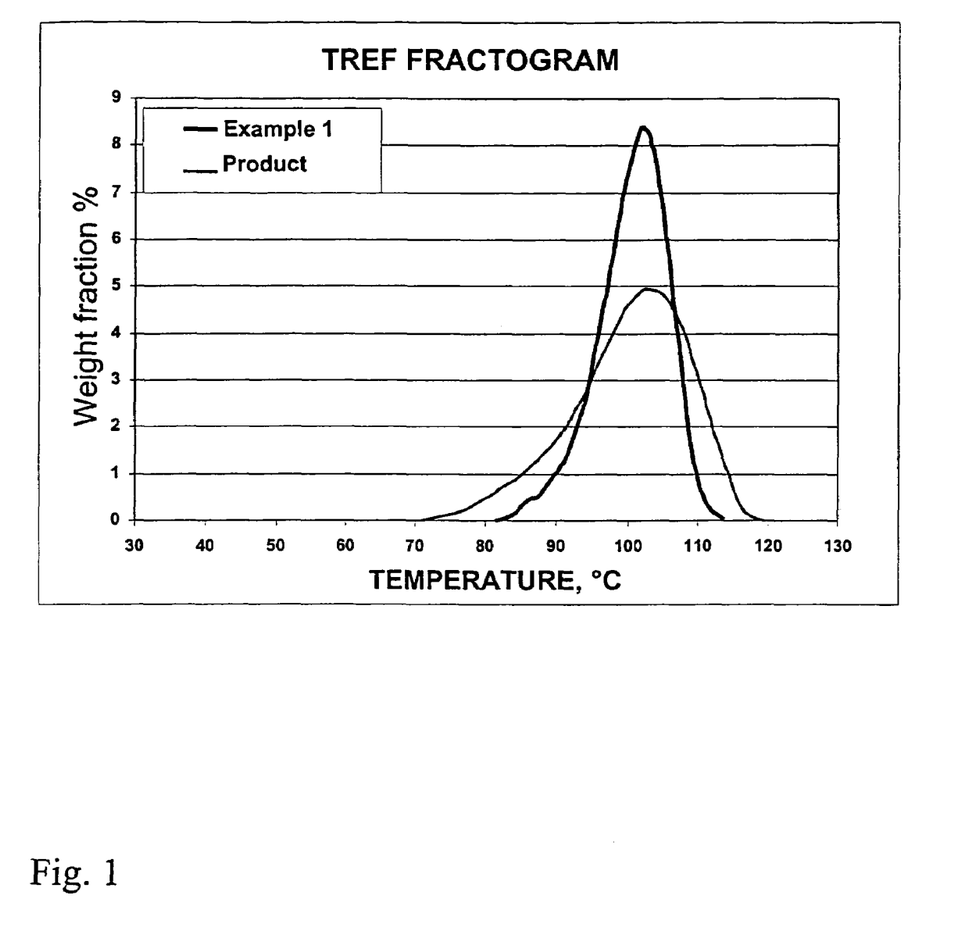
FIG. 1 shows a TREF fractogram of the propylene/ethylene random copolymer according to Example 1 having an overall ethylene content of 3.3 wt. % and the corresponding loop product showing the ethylene comonomer distribution in the polymer.
Figure 2:
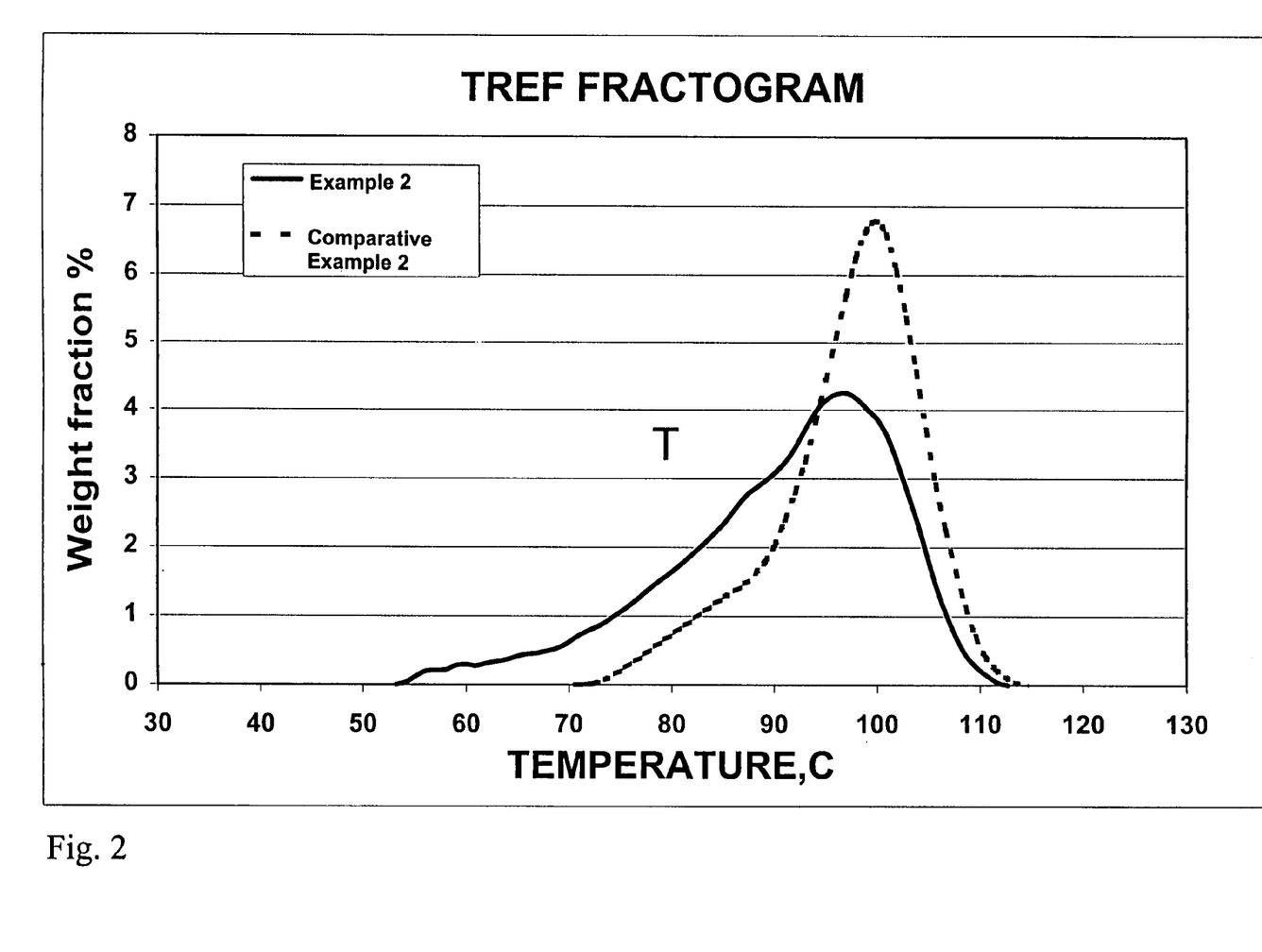
FIG. 2 shows a TREF fractogram showing the continuous TREF functions ("TREF curves") of the propylene/ethylene random copolymer according to example 2 and comparative example 2 having an overall ethylene content of around 5 wt. % (5.1 and 4.7, respectively) showing the bimodal ethylene comonomer distribution in the polymer of example 2. The continuous TREF curves were calculated from the data shown in FIG. 3.
Figure 3:
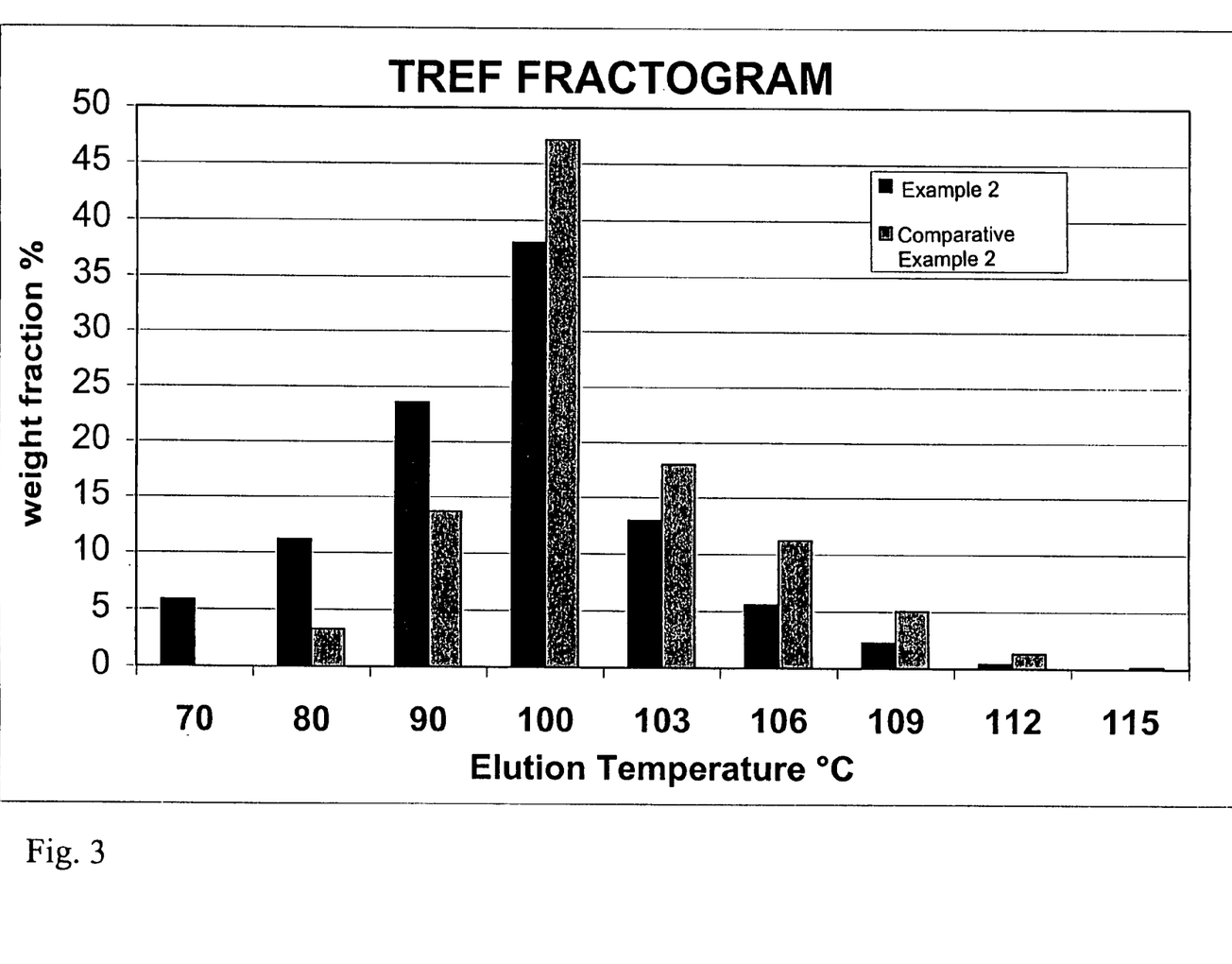
FIG. 3 shows TREF fractograms of the propylene/ethylene random copolymer according to example 2 and comparative example 2 having an overall ethylene content of around 5 wt. % (5.1 and 4.7, respectively).

The difference in ethylene distributions of two high ethylene content copolymers is clearly demonstrated in TREF curves (FIGS. 2 and 3).

TABLE 2

Analytical test results of Cast film and Blow Moulding polymers

| Sample |  | Example 1 | Example 2 | Example 3 | Example 4 | Comp. Ex. 1 | Comp. Ex. 2 |
| --- | --- | --- | --- | --- | --- | --- | --- |
| Pellets |  |  |  |  |  |  |  |
| $MFR_2$ | g/10 min | 7.3* | 7.9* | 7.2* | 1.4 | 8.0* | 8.0* |
| Ethene | wt. % | 3.3 | 5.1 | 6.0 | 5.8 | 3.2 | 4.7 |
|  | mol. % | 4.95 | 7.65 | 9.0 | 8.7 | 4.7 |  |

TABLE 2-continued

Analytical test results of Cast film and Blow Moulding polymers

| Sample | | Example 1 | Example 2 | Example 3 | Example 4 | Comp. Ex. 1 | Comp. Ex. 2 |
|---|---|---|---|---|---|---|---|
| XS | wt. % | 5.7 | 9.1 | | 11.1 | 6.0 | 11 |
| elution interval | ° C. | 30.2 | 58.5 | 60.5 | 60.5 | | 40.9 |
| $T_m$ of PP | ° C. | 142.8 | 137.2 | 137.6 | 139.2 | 142.0 | 136.2 |
| Crystallinity | % | 39.3 | 32.7 | 29.9 | 28.9 | | 34.1 |
| RDA, Zero viscosity | Pas | 2500 | 2450 | 2720 | 24600 | 2420 | |
| $SHI_{(0/50)}$ | Pa | 3.9 | 3.8 | 3.7 | 6.7 | 3.7 | |

*visbroken c) Xylene Solubles (XS)

Figure 4:
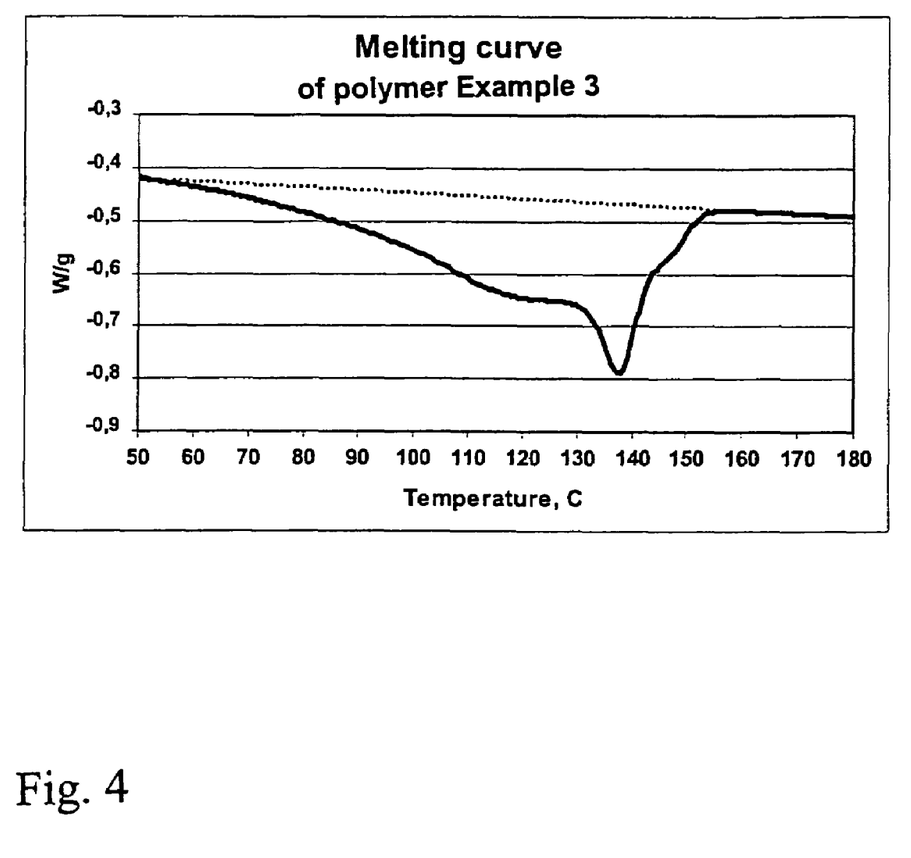
FIG. 4 shows the melting curve of propylene/ethylene random copolymer according to Example 3 having an overall ethylene content of 6 wt. %.
Figure 5:
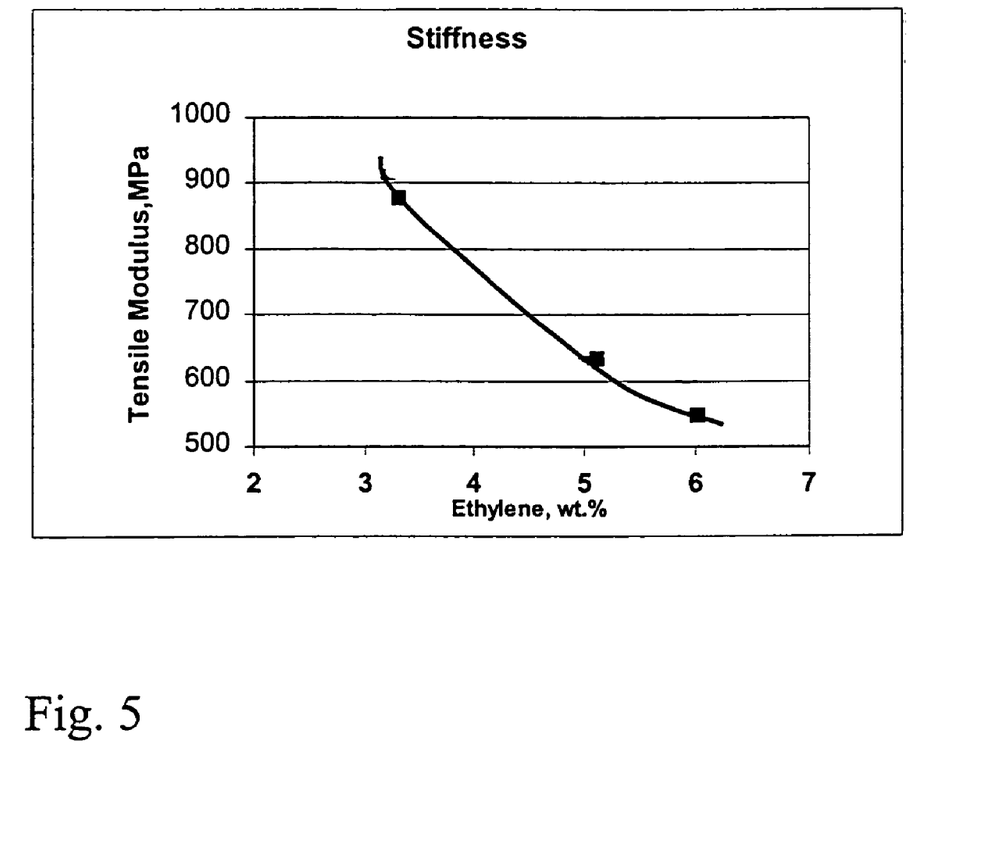
FIG. 5 shows the tensile modulus values of the inventive copolymers as a function of the total ethylene content.

The content of xylene solubles (XS) was increased from 5.5 to 11 wt. %, when total ethylene content increased from 3.3 to 6wt. %. Less sticky material (XS) was produced in GPR at a certain comonomer content compared to loop (FIG. 4). By using the splitted ethylene concept, where loop ethylene content was <4 wt. %, the XS of the final product was much lower than that in high ethylene products having the same final ethylene content, but being produced with the same ethylene content in both reactors.

d) Melting Behaviour

Loop ethylene content determined the melting point of product, and it was between 137 and 147° C. in spite of increased ethylene content in GPR.

The higher ethylene content in GPR was seen in broadening of the melting range. The shape of DSC curve indicates low seal initiation temperature and good sealing properties (FIG. 4).

3) Production of Film

For the production of the films according to the invention, examples 4 and 5 the polymer according to example 2 was used and for the production of the films of examples 6 and 7 the polymer of example 3 was used.

For the production of the comparative films, polypropylene copolymers RD226CF (PP random copolymer) and SD233CF (PP random heterophasic copolymer) commercially available from Borealis were used.

The following additives were added to the propylene random copolymers used for the production of the films according to the invention and to the polymers used for the production of the comparative films before film production:

| Irganox B215 | 1500 ppm (antioxidant mixture of Irganox 1010 and Irgafos 168)) |
| Calcium stearate | 1000 ppm (acid scavenger) |
| Erucamide | 1000 ppm (slip agent) |
| Oleamide | 1000 ppm (slip agent) |
| Syloblock 45 | 1800 ppm (silica, antiblock agent) |

Visbreaking has been done with Trigonox 101 (peroxide) for examples according to the invention, Trigonox B for RD226CF (comparative).

The films were produced on a single-screw extruder with a screw diameter of 60 mm, using a multilayer feedblock and a slot die of 6.6×800 mm in a cast-film setup with a melt temperature at the die of 250° C., a chill roll temperture of 15° C. and a counter-roll temperature of 25° C. The takeoff speed was adjusted such that the desired thickness of 30 and 50 μm was achieved.

4) Testing Standards for Film Testing

The tensile modulus in machine direction MD, the yield stress MD and elongation at break MD were determined according to the tensile test DIN 53455.

The haze was determined according to ASTM D-1003-92.

The delta friction (¼), i.e. the relative reduction the static friction value (inside/inside) was calculated from friction test DIN 53375.

Blooming was assessed qualitatively.

6) Film Properties

For the production of the films of examples 4 and 5 the polymer according to example 2 was used and for the production of the films of examples 6 and 7 the polymer of example 3 was used.

TABLE 3

Film properties

| | | Examples | | | | Comparative Examples | | |
|---|---|---|---|---|---|---|---|---|
| | | 4 | 5 | 6 | 7 | 3 | 4 | 5 |
| Material # | | B5341 | B5341 | B5343 | B5343 | RD226CF | RD226CF | SD233CF |
| $MFR_2$ | g/10 min | 8 | 8 | 8 | 8 | 8 | 8 | 8 |
| Total $C_2$ content | wt % | 5.1 | 5.1 | 6.0 | 6.0 | 3.5 | 3.5 | 16 |
| $T_m$ (DSC) | ° C. | 137 | 137 | 138 | 138 | 142 | 142 | 143 |
| Film thickness | μm | 30 | 50 | 30 | 50 | 30 | 50 | 50 |
| Tens. Modulus MD | MPa | 292 | 302 | 245 | 262 | 411 | 420 | 220 |
| Yield stress MD | MPa | 1.95 | 1.88 | 6.1 | 4.5 | 4.4 | 15.5 | 9.7 |

TABLE 3-continued

|  |  | Film properties | | | | | | |
|---|---|---|---|---|---|---|---|---|
|  |  | Examples | | | | Comparative Examples | | |
|  |  | 4 | 5 | 6 | 7 | 3 | 4 | 5 |
| Elong. Break MD | % | 706 | 718 | 697 | 708 | 675 | 702 | 775 |
| Haze | % | 2.1 | 2.4 | 2.5 | 2.6 | 1.9 | 2.0 | 10.3 |
| Delta friction (1/4)* | % | 50 | n.d. | 40 | n.d. | 30 | n.d. | 25 |
| SIT** | °C. | 104 | n.d. | 104 | n.d. | 114 | 114 | n.d. |
| Delta ($T_m$ – SIT) | °C. | 33 | n.d. | 34 | n.d. | 28 | 28 | n.d. |
| Blooming*** | — | none | none | none | none | strong | strong | light |

*relative reduction of static friction value (inside/inside) from 1 to 4 days
**sealing initiation temperature
***qualitative judgement after 14 days at room temperature

The invention claimed is:

1. A polymer film comprising a propylene random copolymer which was produced according to a process comprising polymerisation of propylene with a comonomer, said comonomer being ethylene or an α-olefin comprising at least four carbon atoms, in the presence of a catalyst in a multistage process comprising polymerisation of propylene with a comonomer in a first reaction zone including at least one slurry reactor to give a first polymerisation product, transferring said first product to a second reaction zone including at least one gas phase reactor and polymerisation of propylene with a comonomer in said gas phase reactor in the presence of said first polymerisation product, wherein the temperature in the gas phase reactor is at least 10° higher than that in the slurry reactor, wherein the polymer has a multimodal comonomer distribution, wherein the content of xylene solubles in the polymer film is from 4 to 15 wt %, and wherein the film has a relative reduction of the static friction value (inside-inside) from one to four days of 35% or more, 40% or more.

2. A polymer film according to claim 1, wherein the copolymer has an elution interval determined according to the TREF method using 1,2,4-trichlorobenzene as an eluent of 50° C. or more.

3. A polymer film according to claim 1, wherein the comonomer in the propylene random copolymer is ethylene.

4. A polymer film according to claim 1, wherein the content of xylene solubles in the polymer film is from 6 to 10 wt %.

5. A polymer film comprising a propylene random copolymer which was produced according to a process comprising polymerisation of propylene with a comonomer, said comonomer being ethylene or an α-olefin comprising at least four carbon atoms, in the presence of a catalyst in a multistage process comprising polymerisation of propylene with a comonomer in a first reaction zone including at least one slurry reactor to give a first polymerisation product, transferring said first product to a second reaction zone including at least one gas phase reactor and polymerisation of propylene with a comonorner in said gas phase reactor in the presence of said first polymerisation product wherein the temperature in the gas phase reactor is at least 10° C. higher than that in the slurry reactor, wherein the shear thinning index (SHI) of the polymer after visbreaking is between 3 and 5, and wherein the film has a relative reduction of the static friction value (inside-inside) from one to four days of 35% or more, or 40% or more.

6. A polymer film comprising a propylene random copolymer which was produced according to a process comprising polymerisation of propylene with a comonomer, said comonomer being ethylene or an α-olefin comprising at least four carbon atoms, in the presence of a catalyst in a multistage process comprising polymerisation of propylene with a comonomer in a first reaction zone including at least one slurry reactor to give a first polymerisation product, transferring said first product to a second reaction zone including at least one gas phase reactor and polymerisation of propylene with a comonomer in said gas phase reactor in the presence of said first polymerisation product wherein the temperature in the gas phase reactor is at least 10° C. higher than that in the slurry reactor, wherein the molar mass distribution (Mw/Mn) is between 4 and 6, and wherein the film has a relative reduction of the static friction value (inside-inside) from one to four days of 35% or more, or 40% or more.

* * * * *

UNITED STATES PATENT AND TRADEMARK OFFICE
CERTIFICATE OF CORRECTION

| | | |
|---|---|---|
| PATENT NO. | : 7,683,141 B2 | Page 1 of 1 |
| APPLICATION NO. | : 10/481785 | |
| DATED | : March 23, 2010 | |
| INVENTOR(S) | : Pirjo Jaaskelainen et al. | |

It is certified that error appears in the above-identified patent and that said Letters Patent is hereby corrected as shown below:

Column 13, line 38 insert --or-- before the phrase "40% or" in the next to last line of claim 1.

Signed and Sealed this

Twenty-ninth Day of June, 2010

David J. Kappos
*Director of the United States Patent and Trademark Office*